United States Patent [19]

Houck

[11] 4,042,435
[45] Aug. 16, 1977

[54] CLOSED TORUS WOUND CARCASS FOR A CLOSED TORUS TIRE

[75] Inventor: Stanley J. Houck, Akron, Ohio

[73] Assignee: The Goodyear Tire & Rubber Company, Akron, Ohio

[21] Appl. No.: 646,718

[22] Filed: Jan. 5, 1976

[51] Int. Cl.² .................... B29H 15/00; B29H 17/02
[52] U.S. Cl. ................. 156/121; 156/123 R; 156/394; 156/397
[58] Field of Search .............. 156/110 R, 117, 118, 156/121, 122, 123 R, 130, 133, 157, 172, 195, 394 R, 397, 414, 415, 417, 431, 433, 446, 456, 457, 5 R, 503

[56] References Cited

U.S. PATENT DOCUMENTS

| 1,274,910 | 8/1918 | Lister | 156/118 |
|---|---|---|---|
| 1,385,220 | 7/1921 | Marquette | 156/122 |
| 2,915,102 | 12/1959 | Alexeff et al. | 156/117 UX |
| 3,057,396 | 10/1962 | Hanson | 156/117 |
| 3,245,853 | 4/1966 | Reinhart | 156/117 |
| 3,375,150 | 3/1968 | Alexeff | 156/117 |
| 3,392,072 | 7/1968 | Alderfer | 156/123 |
| 3,458,146 | 7/1969 | Warner | 156/117 |
| 3,606,921 | 9/1971 | Grawey | 156/117 |
| 3,613,762 | 11/1969 | Reinhart | 156/117 |
| 3,864,188 | 2/1975 | Grawey et al. | 156/117 |

Primary Examiner—Charles E. Van Horn
Assistant Examiner—John E. Kittle
Attorney, Agent, or Firm—F. W. Brunner; R. S. Washburn

[57] ABSTRACT

Method and apparatus for wrapping a cord or wire in a toroidal helix about a liner to form a closed torus carcass. An extruder, die, and diehead provide means for extruding a liner having a horseshoe-shaped profile. Circumferential edges of the liner are joined with a preformed assembly of bead rings and a spacer ring. Cord or wire is wound snugly about an array of control fingers and then slipped off the fingers as successive tensionless turns about the liner and rings as the latter rotate through a winding plane in which a spool supplying cord or wire orbits. No rigid core is required. An endless inflatable tube can be used in lieu of the extruded liner.

22 Claims, 3 Drawing Figures

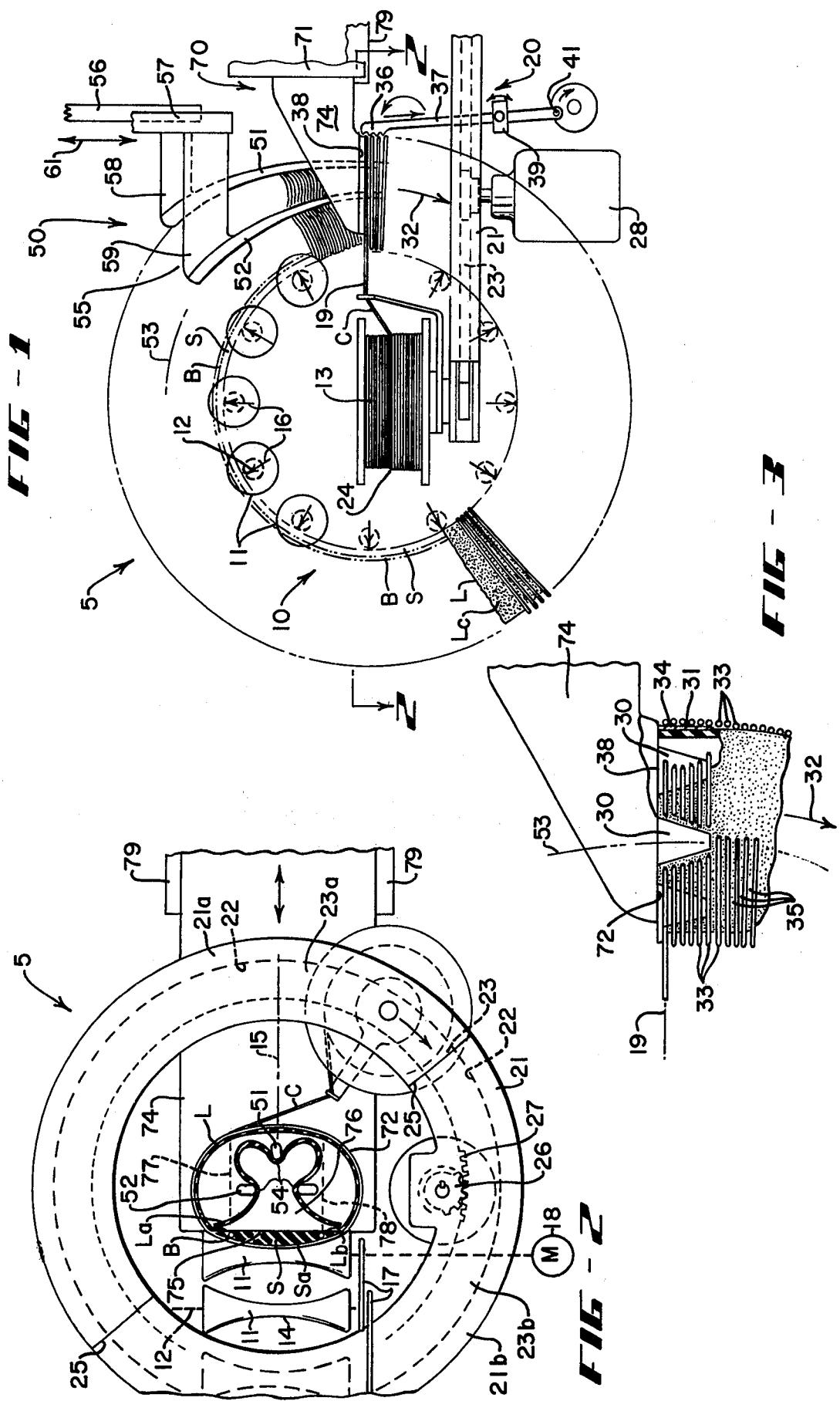

CLOSED TORUS WOUND CARCASS FOR A CLOSED TORUS TIRE

The foregoing abstract is not to be taken as limiting the invention of this application, and in order to understand the full nature and extent of the technical disclosure of this application, reference must be made to the accompanying drawing and the following detailed description.

The present invention relates to inflatable tires, particularly to the class of heavy duty tires requiring, in use, inflation pressures several times greater than the surrounding atmospheric pressure. Still more particularly, it relates to making a cord wound torus carcass for a tire of the closed torus type wherein a reinforcement cord is wound continuously in a toroidal helix to form the torus. Such tires are capable of sustaining inflation pressure independently of any wheel on which the tire may be mounted.

A notable disadvantage heretofore in building tires of the closed torus type having a continuously wound reinforcement cord has been the need always to use a rigid core having an outside surface conforming to the desired shape of the torus, which core had to be removed by way of the inflation inlet in the tire. In turn, this required a core which could be reduced to a fluent state to be removed. Such cores have been constructed, for example, of material such as plaster of paris which can be dissolved in mild acids such as acetic and then washed out from the interior of the tire by way of the inflation inlet. Each such core is necessarily destroyed after building one tire.

The objects of the invention, therefore, are an improved method and an apparatus for building a closed torus tire having continuously wound reinforcement cord or wire thereon without resort to a building core of any description.

Broadly, the invention comprises an apparatus for building a cord wound torus carcass for a closed torus tire, the apparatus comprising chuck means for supporting and rotating said carcass about an axis, extruding die means for extruding a carcass liner having a curvate open profile and spaced apart circumferential edges, said die means being disposed to extrude said liner tangently of said chuck means, wrapping means for orbiting a cord supply spool about said carcass in a radial plane of said chuck, and a plurality of control fingers disposed closely about said profile and extending normal to said plane to receive a plurality of turns of cord thereabout from said spool.

Broadly, in accordance with the invention, the method comprises, building a cord wound torus carcass for a closed torus tire, the method comprising mounting a bead ring-spacer ring assembly and a carcass liner for rotation about a common axis, wrapping a cord spirally around a plurality of cord control fingers disposed closely about said liner to form a plurality of turns of cord, and transferring successive turns of cord from the control fingers to the liner, the cord in successive turns so transferred being substantially free of tension.

Further, the liner is provided by extruding a carcass liner having a curvate open profile and spaced apart circumferential edges to extend circumferentially of said assembly while concurrently rotating the assembly and adhering said edges continuously to the assembly to form a closed profile.

To acquaint persons skilled in the art with the principles and practice of the invention, certain preferred embodiments illustrating the best presently contemplated mode of practicing the invention will be described hereinbelow, making reference to the drawings which are a part of the description and in which drawings;

FIG. 1 is a schematic view of an apparatus in accordance with the invention;

FIG. 2 is a schematic view partly in section as taken on the line 2—2 in FIG. 1; and FIG. 3 is an enlarged view of a portion of FIG. 1.

The apparatus 5 in accordance with the invention is illustrated schematically in FIGS. 1 and 2 and comprises a chuck 10, a cord wrapping mechanism 20, a plurality of cord control fingers 30, and a set of converging guide bars 50, as well as an extruder 70 constructed and arranged to form a carcass liner L.

The chuck 10 serves as means for supporting and rotating a carcass for a closed torus tire, and comprises an annular array of concave face rolls 11 each mounted for rotation about its own axis 12 parallel to and equally distant from the central axis 13 of the chuck. The concave faces 14 of the rolls serve to locate the carcass equatorial plane 15 coincident with the mid-axial rotation plane of the chuck. The concave faces can be curved as shown, or otherwise shaped to locate the carcass suitably for wrapping cord or wire thereon.

The rolls 11 are mounted to be moved toward, or away from, the axis 13 for loading or removing a carcass on the chuck. Any suitable means for moving the rolls can be used, such means being represented by the arrows 16.

To rotate the rolls, each about its own axis, roll drive means is provided by a system 17 of flexible elastic belts each connecting an adjacent pair of rolls. The system of belts is connected to a common drive 18. The rolls do not rotate about the chuck axis. The rotation of the roll moves the carcass circumferentially relatively of a plane radial of the axis, referred to herein as the winding plane 19.

The cord wrapping mechanism 20 provides means for wrapping a cord or wire C on the carcass to form an endless toroidal helix, the center line of which is herein termed the toric axis 53. The mechanism 20 includes a frame 21 having a circular track 22 in which a spool carrier ring 23 is constrained to rotate around the carcass in the winding plane 19 while the carcass on the chuck 10 rotates about the axis 13. The spool 24, having a supply of cord or wire C wound thereon, thus orbits the carcass in the winding plane, wrapping the cord or wire continuously on the carcass.

The frame 21 has two parts 21a,21b, each having a semi-circular part of the track, the parts being relatively movable to allow loading and unloading of the chuck. The ring 23 is likewise formed in two semi-circular parts 23a,23b, each being located, when the frame parts are separated, in an associated part of the frame 21. When the frame and ring are closed in operative relation their respective ends are abutted at the parting line 25 oblique to the winding plane 19 to form a unitary ring and endless closed circular track.

To drive the spool 24 in its orbit about the carcass, the wrapping mechanism includes orbit drive means provided by a pinion 26 engaging a ring gear 27 formed on the spool ring 23 and rotated by the motor 28. The motor 28 is connected by a gear train (not shown) in timed rotational relation to the chuck drive 18 at a preselected ratio such that the spool 24 orbits the carcass to wind the cord or wire at a pitch of from 6 to 12 turns per inch of circumference at the bead rings B.

The timed relation between the orbit drive means and the chuck drive can be accomplished as well by electrical controls well known to persons skilled in the related arts.

The plurality of cord control fingers 30 furnish means for controlling the cord or wire C being wrapped about the carcass, acting to isolate the carcass from direct effect of the tension of the cord or wire and serving also to determine the length of each turn of the cord or wire of the toroidal helix.

The fingers 30 are spaced around and close to the periphery of the torus in the plane 19 and extend through the winding plane 19 a distance sufficient to accommodate from two to about five turns of cord or wire wrapped about the array of fingers. Each of the fingers is fixed rigidly adjacent to the winding plane and its outward surface 31 tapers slightly inward in the direction of the rotation of the carcass (arrow 32) toward the carcass liner L to facilitate movement of the successive turns 33 of cord or wire from the array of fingers to the liner L as the carcass rotates. The inward surfaces 34 of the fingers are close to or in contact with the carcass liner L as it moves through the array of fingers. The fingers are spaced along the periphery to expose portions 35 of the liner between each pair of fingers to pressure contact by the successive turns 33 of the wire or cord. The contact of the cord or wire with the liner exposed between pairs of fingers serves to fix the positions of each turn relative to the carcass circumference as well as to move successive turns of cord or wire off the array of fingers.

The peripheral distance measured around the array of fingers 30, the bead rings B and the preformed spacer ring S in the winding plane 19 determines the length of each turn 33 of cord or wire wound therearound. The fingers are, therefore, sized and spaced to provide the length of each turn desired in the cord wound torus carcass.

To move or assist in moving successive turns of cord or wire off the array of fingers, the apparatus includes a plurality of feed rakes 36, each having teeth formed to engage, and disengage from, the turns of cord or wire wrapped about the fingers. Each feed rake is associated with one of the fingers. The teeth are formed on an arm 37 which extends from the finger support face 38 outwardly thereof beyond the winding plane. Each rake arm is carried in a pivotably mounted slide block 39 which slidably engages the arm 37 intermediate the rake teeth and its opposite end. The latter end is pivotally secured to a crank pin 41 such that the rake teeth move away from the die face, moving the cords or wires on the associated finger, then swing away from the finger, move toward the die face, and swing toward the finger and engage the cord or wire turns 33 including the most recently wound turn. The described movement of the rake is effected once during each orbit of the spool.

The cord control means of the invention provides notable advantages particularly in rendering the hitherto required rigid core unnecessary.

The converging guide bars of the set 50 thereof in the apparatus 5 provide fluting means for funneling the first wrapped turns through the array of fingers sufficiently to complete the toroidal helix with its last wound turn suitably spaced from the first wound turn. The guide bars also funnel the first formed end of the liner L to insert it into the last formed liner end, thus to complete the closed torus liner of the carcass.

The fluting means comprises guide bars 51,52 converging in the direction 32 from the outward surface of the torus carcass inwardly toward the toric axis 53 to form flutes 54 in the first formed end of the carcass as this end moves toward the winding plane. The free ends of the guide bars terminate at or slightly beyond the winding plane. The flutes reduce the radial height and the axial width of the first formed end. The center bar 51 of the set is in the mid-axial plane 15 of the chuck 10 and converges inward radially of the chuck. The two side guide bars 52 are curved to conform to the curvature of the sides of the carcass near its maximum axial width and converge toward the plane 15. As the first formed end of the carcass rotates into the converging zone 55 defined by the bars, the flutes 54 are formed gradually with a minimum of displacement of the cords or wires relative to the liner.

To support and to move the set 50 of guide bars from the operative position, FIG. 1, to a remote position, the fluting means provides bracket means which include a fixed slide 56 and a slide plate 57 having a single arm 58 to which the center guide bar 51 is attached and a pair of arms 59 to which the side guide bars 52 are respectively secured. The slide plate can be moved along the slide manually or by suitable power means indicated by the arrow 61. Preferably, the guide bars are elastically yieldable to facilitate movement of the set off the wound carcass.

It is contemplated within the scope of the invention that the liner can be provided in the form of an endless tube which can be cured or partially cured before being placed on the chuck together with a pair of bead rings in appropriately spaced coaxial relation with the tube.

In its presently preferred form, the apparatus 5 includes means for extruding the liner L while wrapping a cord or wire concurrently thereabout. The extruded liner has the form of an open torus with a cross-section profile which is curved between axially spaced apart and circumferentially extending edges $La,Lb$. The profile shown conforms to an ellipse; it can as well conform to a circle, or to any practical shape suitable for being wrapped by a cord or wire.

The cross-section periphery of the closed torus is completed by adhering the edges of the liner to the preformed spacer ring S of uncured or partially cured rubber which is supported on and rotated by the chuck. The preformed ring also serves to position a pair of inextensible bead rings B in appropriate axially spaced relation on the chuck 10. The cord or wire is wrapped about the liner as well as about the beads and the preformed ring.

The means for extruding the liner comprises a conventional extruder 71, a die 72 having a profile forming opening 73 and providing the finger support face 38, and a die head 74 connecting the die in extrudate flow communication with the extruder and supporting the die in spaced relation to the chuck and the winding plane as well as to the extruder. The face 38 of the die is arranged parallel to and spaced a small distance from the winding plane 19. The fingers 30 of the cord control means previously described are fixed on the die face 38 and spaced along the periphery of the die opening 73 with their inward surfaces at or close to the opening.

The die opening 73 is configured to form the liner profile as an arc about the toric axis 53 of the carcass which arc extends more than 210 degrees and less than 330°, and in the present embodiment is about 270°, about the toric axis. The wall thickness of the liner can be as required to suit the service for which the carcasss is intended.

Thus, the open space 75 between the edges subtends an arc about the toric axis of from 30° to 150°, and in the present embodiment is about 90°, which is about one-fourth of the periphery of the profile.

Except as noted, the die 72 is constructed conventionally and is fixed in the die head 74 which channels the extrudate from the extruder 71 to issue from the die opening 73.

The die head in the apparatus has a passage 76 extending therethrough in a direction normal to the winding plane. The passage is also open toward the chuck, forming two flanks 77,78 which straddle the carcass being formed, as does the die.

The passage not only permits the first formed end of the carcass, reduced in height and width by the guide bars 51,52 of the fluting means as described, to move through it toward the winding plane, but also allows the die head 74 and die 72 to be separated radially from the completed endless carcass. The guide bars 51,52 converge to reduce the axial width of the carcass and thus allow relative radial movement of the flanks of the die head and the completely wound carcass.

In the present apparatus the extruder 71 is mounted on a slide base 79 for movement radially away from the chuck 10, carrying the die head 74 and die off the carcass. The part 21a of the frame associated with the extruder means is moved therewith away from the part 21b associated with the chuck 10.

The set 50 of convergent guide bars is then also, but independently, moved clear of the wound torus carcass by its slide means. As the guide bars release the flutes in the first formed end of the liner, it expands elastically and a circumferential splice is made between the first and last formed ends.

In the method of the invention for building a cord wound closed torus carcass for a closed torus tire, a spacer ring S of uncured, or partially cured rubber and a pair of coaxially spaced apart inextensible bead rings B are combined as a unitary assembly and mounted for rotation about an axis. The spacer ring serves to locate the bead rings parallel to and equally spaced from an equatorial plane normal to the axis.

The spacer-bead ring assembly is mounted on the chuck 10, the rolls 11 being moved outwardly to support the assembly relative to the axis 13 and the plane 15. As previously mentioned herein, the carcass liner L can be provided, optionally, in the form of an endless inflatable tube which is combined with the spacer ring and bead rings as an additional part of the assembly and mounted on the chuck.

The spool 24, having a supply of cord or wire C of any material and construction suitable for tire reinforcement wound thereon, is placed on the spool carrier ring 23. The frame 21 and the carrier ring 23 are then closed, abutting the respective ends at 25 to form a continuous circular track 22 and endless carrier ring around the carcass adjacent the winding plane 15.

In the apparatus 5, the extruder 71, die 72, and die head 74 are moved to the operating position relative to the chuck 10 and the bead-spacer ring assembly, illustrated in the drawings, to form the carcass liner L by extrusion thereof from the die 72 directly onto the spacer ring S while cord or wire C is being wrapped therearound. As the liner is extruded its circumferential edges $La, Lb$ are progressively adhered to the spacer ring S, the surface of which is tacky, to form the closed torus inflatable liner of the carcass.

With the extruder die 72 in position, the cord control fingers 30 are disposed about the liner as has been described above. The free end of cord or wire is then wrapped a number of turns (2 to 5) about the array of fingers, the terminal end being secured to the spacer ring. As these and successive turns 33 are wrapped about the fingers 70 a portion of each turn is adhered to and impressed in the radially inward surface $Sa$ of the spacer ring between the bead rings B, and are thus fixed in the ring S at the desired cord-to-cord spacing.

A short length of liner, herein called the first formed end $Lc$, is extruded concurrently with starting rotation of the chuck 10. The wrapping mechanism 20 is then activated to orbit the spool 24 about the carcass and to form a turn 33 of cord or wire on the fingers 30 at each revolution. The chuck is rotated in timed relation with the orbiting of the spool so that the successive turns are spaced as desired (6–12 turns/inch of bead ring circumference).

As the cord or wire forms successive turns around the fingers, the turns are progressively moved from the fingers to the carcass as the latter moves through the array of fingers. Each turn is adhered to the spacer ring and to the liner where it is exposed in the spaces between the fingers around the carcass near the winding plane. Each turn thus tends to be moved from the fingers with the movement of the liner. To assist movement of succeeding turns to the liner from the fingers the successive turns are urged off the fingers in the direction 32 of the carcass rotation by intermittent force applied in timed relation with the wrapping of successive turns. In the wrapping mechanism, the intermittent force is applied by the feed rake 36 described above.

By wrapping the cord or wire around the array of control fingers before moving the successive turns from the fingers to the liner, the tension in the cord or wire necessary to manage the cord or wire is prevented from affecting the shape of the liner. Thus the cord or wire turns are, when moved onto the liner, free of any significant tension. The lack of tension in the cord or wire turns when placed about the liner, renders the heretofore required rigid core unnecessary.

The extrusion of the liner and concurrent wrapping of cord or wire thereon is continued while the carcass on the chuck 10 is rotated 360°. Before the first formed end $Lc$ reaches the converging zone 55 the set 50 of guide bars is moved into its position, shown in FIG. 1, to form height and width reducing flutes 54 in the first formed end of the carcass, and particularly in the liner so that the first formed end can pass through the passage 76 in the die and die head between the flanks 77,78 as well as through the array of control fingers 70, and be inserted in the last formed end of the torus liner as it is formed. The interior of the first formed end is treated with an anti-tack agent such as soapstone or zinc stearate to prevent forming permanent folds or flutes therein in the converging zone.

As rotation of the carcass on the chuck continues, the first formed end of the carcass, reduced in radial height and in axial width approaches the winding plane, and the end $Lc$ of the liner is inserted in the liner being formed at the die. When the full 360° of the carcass is wrapped, the rotations of the rolls 11 and spool carrier ring 23 are stopped. The cord or wire is cut and its end secured to the carcass. Extrusion of the liner is shut off and it is severed from the flow in the die head. While the carcass is held at its reduced width between the side guide bars 52 of the fluting means, the control fingers 30 and the die head 74 are moved radially away from the carcass. The frame part 21a and associated carrier ring part 23a are moved with the die head to open the wrapping mechanism 20. The set of guide bars 51,52 is then moved away from the carcass, allowing the first formed liner end to expand elastically and to form a lapped splice to close the inflation chamber of the tire. The rolls 11 of the chuck are moved inward toward the axis 13 and the completed wound closed torus carcass can be removed from the chuck.

To facilitate handling the closed torus carcass, an inflation valve (not shown) is inserted through the wall of the wound torus, preferably in the region between the beads. Valves suitable for the purpose and methods of inserting them, being known and outside the scope of the present invention, are therefore not further described here.

The carcass described can then be completed by placing additional components thereon, for example, a breaker belt and a thread therearound, and subsequently curing the tire to provide a continuously wound closed torus tire for heavy duty and capable of inflation to pressure of several times atmospheric pressure.

The term rubber is used herein in its broadest generic sense and will be understood to mean any of the compounds of natural and/or synthetic rubber, or equivalent materials used in making tires.

While certain representative embodiments and details have been shown for the purpose of illustrating the invention, it will be apparent to those skilled in the art that various changes and modifications may be made therein without departing from the spirit or scope of the invention.

What is claimed is:

1. A method of building a cord wound torus carcass for a closed torus tire, the method comprising mounting a bead ring-spacer ring assembly and a carcass liner for rotation about a common axis, wrapping a cord spirally around a plurality of cord control fingers disposed closely about said liner to form a plurality of turns of cord, and transferring successive turns of cord from the control fingers to the liner, the cord in successive turns so transferred being substantially free of tension.

2. The method of building a cord wound torus carcass for a closed torus tire, the method comprising mounting a bead ring spacer assembly for rotation about an axis, extruding a carcass liner having a curvate open profile and spaced apart circumferential edges to extend circumferentially of said assembly while concurrently rotating the assembly and adhering said edges continuously to the assembly to form a closed profile, wrapping a cord spirally around a plurality of cord control fingers disposed closely about said profile to form a plurality of turns of cord, and transferring successive turns of cord from the control fingers to the liner being extruded, said turns of cord when transferred being substantially free of tension.

3. Method as claimed in claim 2, and inserting the first formed end of the liner into the last formed end thereof while continuing to wind the cord about said control fingers.

4. Method as claimed in claim 3, including forming at least one flute extending circumferentially from said first end to reduce the radial height and axial width thereof to facilitate said inserting.

5. Method as claimed in claim 1, while winding cord about said control fingers, impressing said cord in said liner exposed between peripherally adjacent pairs of the fingers.

6. Method as claimed in claim 1, and in transferring successive turns of cord from said control fingers, exerting intermittent force in timed relation with wrapping each turn to urge said turn off said fingers to said liner.

7. An apparatus for building a cord wound torus carcass for a closed torus tire, the apparatus comprising chuck means for supporting and rotating a bead ring spacer ring assembly about an axis, extruding die means for extruding a carcass liner having a curvate open profile and spaced apart circumferential edges, said die means conforming to said liner and disposed to extrude said liner tangentially of said chuck means with said edges juxtaposed to said assembly, wrapping means for orbiting a cord supply spool about said carcass in a radial plane of said chuck, and a plurality of control fingers disposed closely about said profile and extending normal to said plane to receive a plurality of turns of cord thereabout from said spool.

8. Apparatus as claimed in claim 7, said chuck means including a plurality of rolls each having a carcass engaging surface formed to register said carcass with the mid-circumferential plane of said chuck, said rolls being mounted for movement inwardly toward the axis to release the carcass for removal from said chuck means.

9. Apparatus as claimed in claim 8, including drive means for rotating said rolls to effect rotation of the carcass relative to said plane in timed relation with the orbiting of said spool.

10. Apparatus as claimed in claim 7, said extruding die means including an open passage having spaced apart flanks, said passage being constructed and arranged to accommodate relative movement between the extruder die means and said carcass both circumferentially and radially with respect to said carcass.

11. Apparatus as claimed in claim 10, wherein said flanks are spaced apart 90° relative to the toric axis of the carcass.

12. Apparatus as claimed in claim 10, wherein said die means has an extrudate forming profile curved arcuately about the toric axis of said carcass at least 180° but less than 330°.

13. Apparatus as claimed in claim 12, wherein said profile conforms to an ellipse.

14. Apparatus as claimed in claim 12, wherein said profile conforms to a circle.

15. Apparatus as claimed in claim 7, said wrapping means including a two-part frame having one part associated with the extruding die means and the other part associated with the chuck means, and movement means for moving one of the extruding die means and the chuck means relative to the other thereof to enable removal of the cord wound torus carcass.

16. Apparatus as claimed in claim 15, said twopart frame comprising two semi-circular parts each having a semi-circular carrier ring part supported rotatably therein, said ring parts being abutted to form a continuous ring rotatable in said frame when said frame parts are in abutting operative relation to one another.

17. Apparatus as claimed in claim 16, a ring gear formed on said carrier ring parts and a pinion in driving mesh with said gear to rotate said carrier ring to carry said spool orbitally about said carcass.

18. Apparatus as claimed in claim 7, said cord control means comprising a plurality of fingers mounted to extend from the extrusion die means closely adjacent the extrudate forming profile thereof and spaced apart along the periphery of said profile, the length of said fingers normal to the face of said die means being sufficient to accommodate a plurality of spaced apart turns of cord wrapped about the array of fingers.

19. Apparatus as claimed in claim 18, said fingers being disposed along the periphery of said profile such that the length of a single turn of cord wrapped snugly about the array of fingers equals the length of a single turn of cord untensioned in the closed torus cord wound tire.

20. Apparatus as claimed in claim 10, including fluting means for funneling the first formed end of said liner into the last formed end thereof during the rotation of said liner and bead assembly by said chuck means.

21. Apparatus as claimed in claim 20, said fluting means comprising a set of guide bars extending through said passage in the extruding die means and converging toward the toric axis of the carcass, and bracket means supporting said bars and movable to retract said bars from said passage.

22. Apparatus as claimed in claim 21, said set of guide bars comprising a first bar disposed in the midcircumferential plane of the carcass and converging arcuately inwardly to form a flute reducing the radial height of the carcass and an opposing pair of side bars converging axially to form respectively a flute in each side of the carcass reducing the axial width thereof.

* * * * *